INVENTORS
JOHN PRESPER ECKERT, JR.
JOHN C. SIMS, JR.

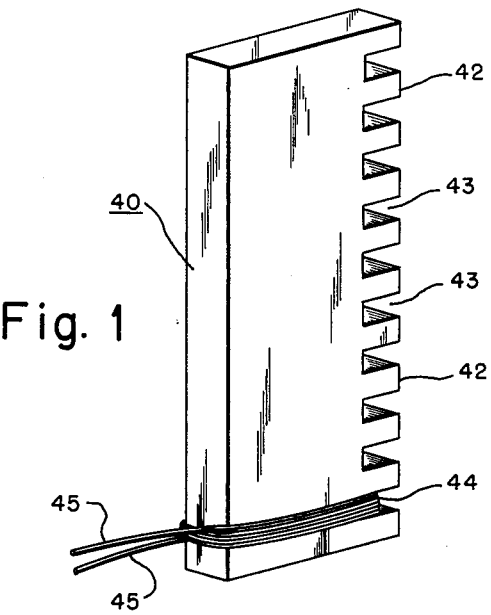
Fig. 1
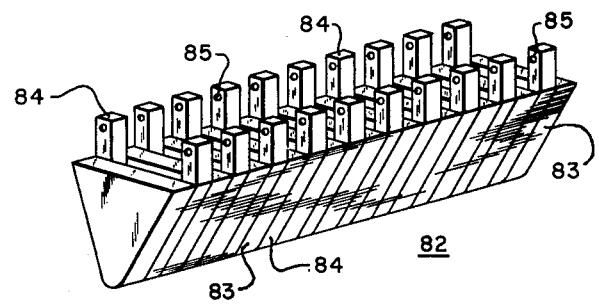
Fig. 2
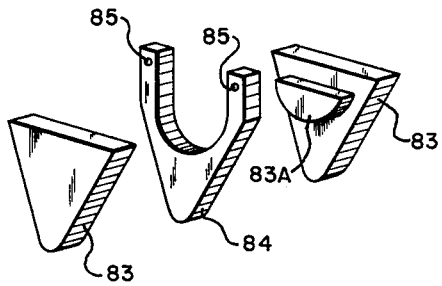
INVENTORS
JOHN PRESPER ECKERT, JR.
JOHN C. SIMS, JR.
ATTORNEY Dec. 5, 1961  J. P. ECKERT, JR., ET AL  3,012,232
HIGH SPEED PRINTER
Filed Jan. 27, 1953  11 Sheets-Sheet 2
Fig. 3
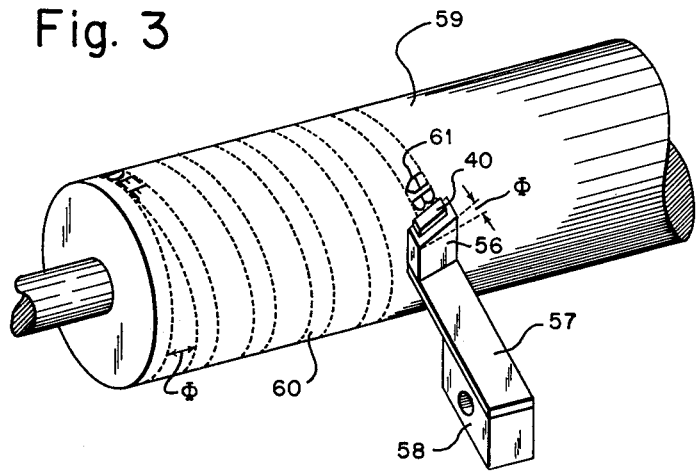
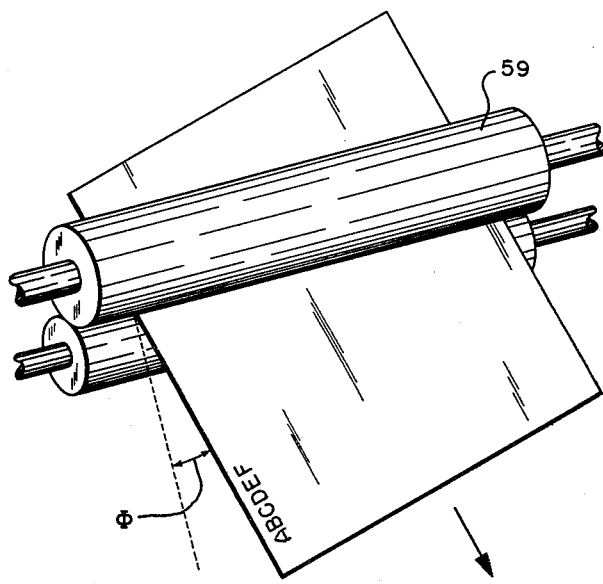
Fig. 5
INVENTORS
JOHN PRESPER ECKERT, JR.
JOHN C. SIMS, JR.
ATTORNEY

ATTORNEY

Dec. 5, 1961   J. P. ECKERT, JR., ET AL   3,012,232
HIGH SPEED PRINTER
Filed Jan. 27, 1953   11 Sheets-Sheet 5
Fig. 7
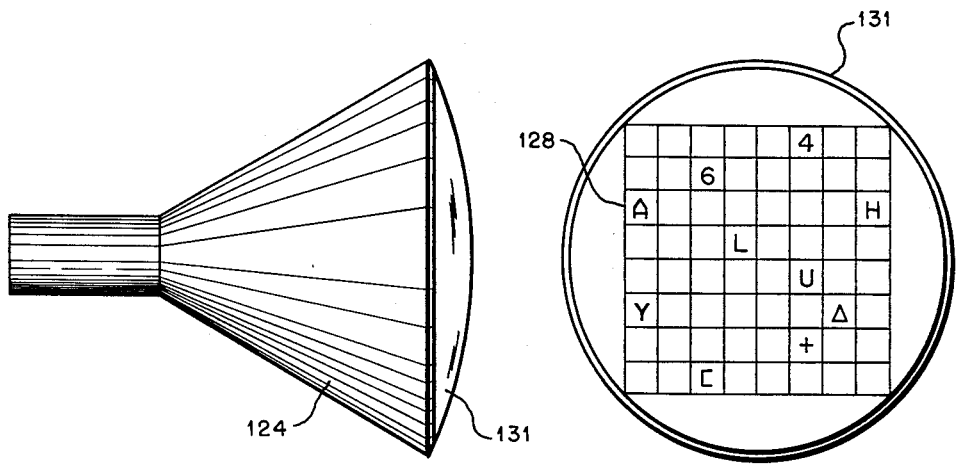
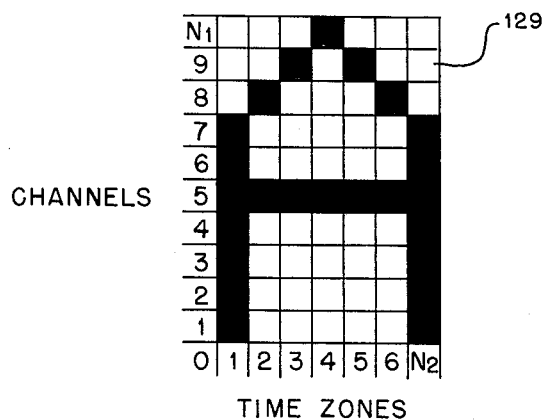
TIME ZONES
Fig. 8
INVENTORS
JOHN PRESPER ECKERT, JR.
JOHN C. SIMS, JR.
ATTORNEY Dec. 5, 1961    J. P. ECKERT, JR., ET AL    3,012,232
HIGH SPEED PRINTER
Filed Jan. 27, 1953    11 Sheets-Sheet 6

INVENTORS
JOHN PRESPER ECKERT, JR.
JOHN C. SIMS, JR.

ATTORNEY

Dec. 5, 1961   J. P. ECKERT, JR., ET AL   3,012,232
HIGH SPEED PRINTER
Filed Jan. 27, 1953   11 Sheets-Sheet 8
Fig. 11
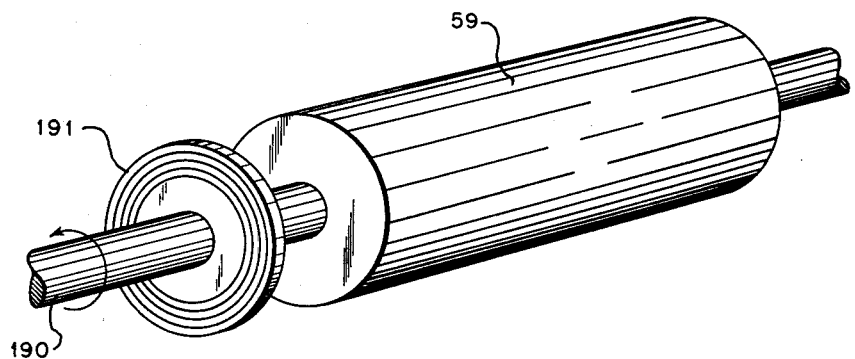
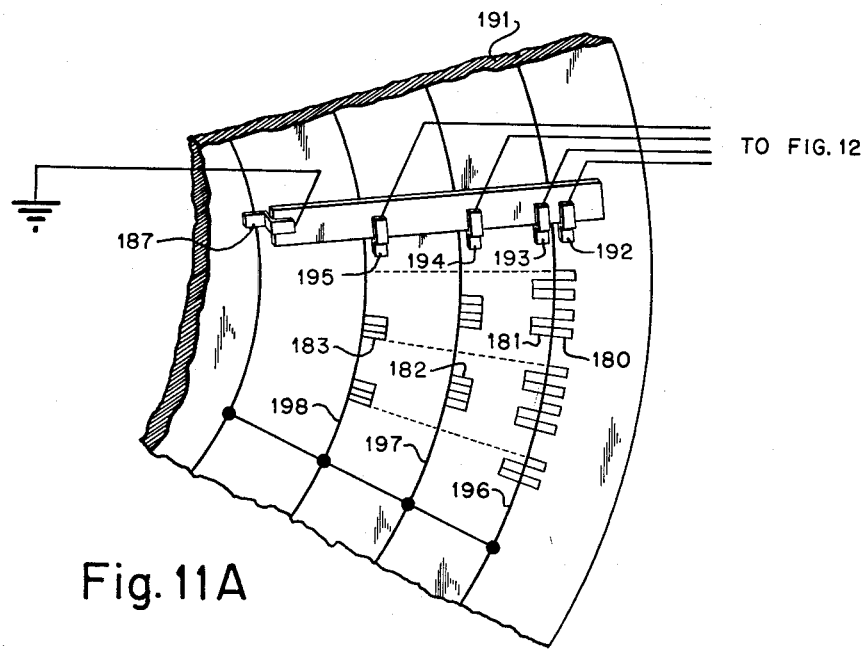
Fig. 11A
INVENTORS
JOHN PRESPER ECKERT, JR.
JOHN C. SIMS, JR.
ATTORNEY

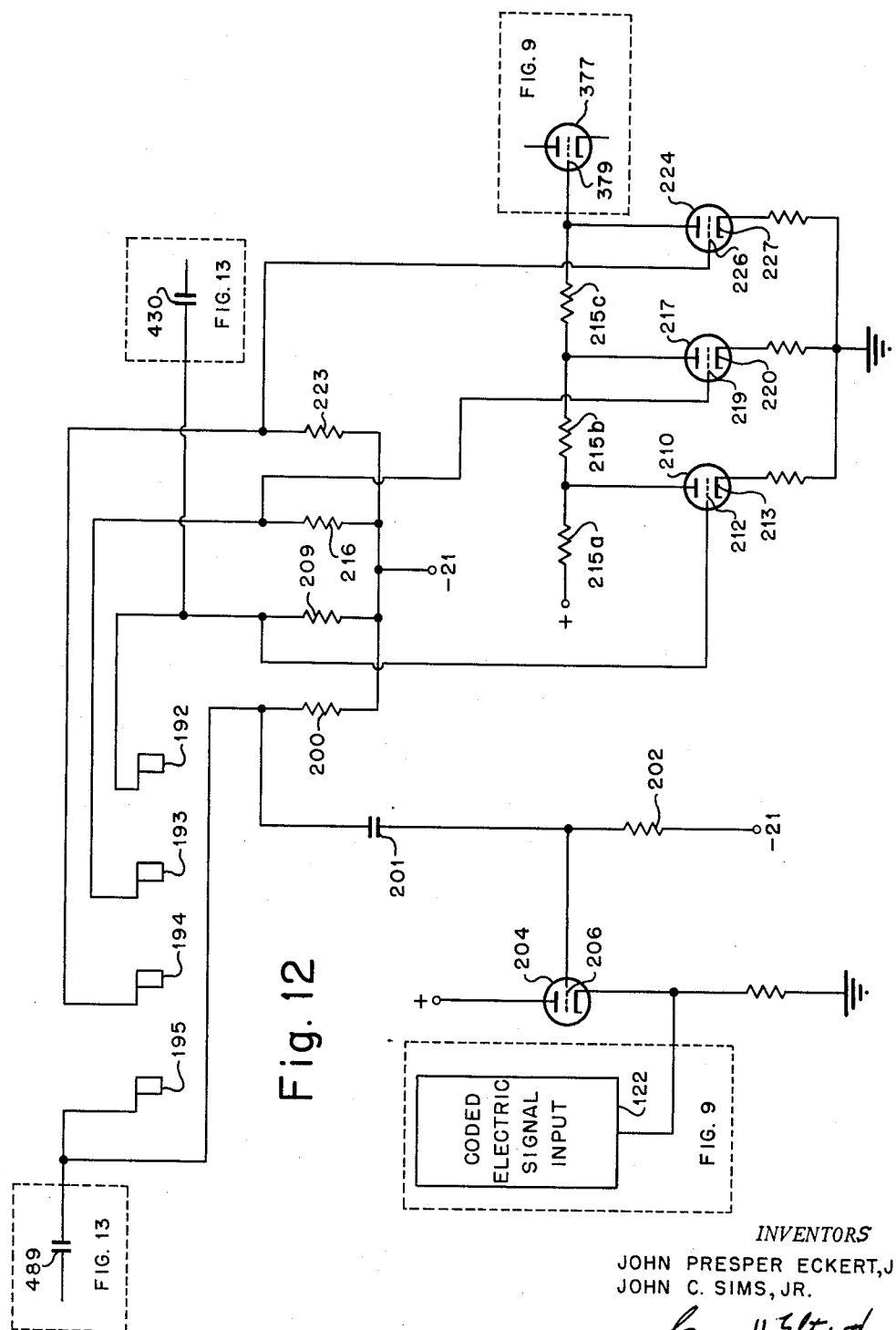

INVENTORS
JOHN PRESPER ECKERT, JR.
JOHN C. SIMS, JR.

ATTORNEY

Dec. 5, 1961  J. P. ECKERT, JR., ET AL  3,012,232
HIGH SPEED PRINTER
Filed Jan. 27, 1953   11 Sheets-Sheet 11

INVENTORS
JOHN PRESPER ECKERT, JR.
JOHN C. SIMS, JR.
ATTORNEY

United States Patent Office 3,012,232
Patented Dec. 5, 1961

3,012,232
HIGH SPEED PRINTER
John Presper Eckert, Jr., Gladwyne, and John C. Sims, Jr., Spring House, Pa., assignors to Remington Rand Inc., Philadelphia, Pa., a corporation of Delaware
Filed Jan. 27, 1953, Ser. No. 333,574
29 Claims. (Cl. 340—174.1)

This application is a continuation in part of the pending application Serial Number 221,362, and the invention disclosed herein relates to an electromagnetic apparatus adapted to produce original typographical images.

In many cases it is desired to create typographical images which are not to be reproduced from pre-existing typographical originals, but which are to be translated from coded electric signals transmitted to the printer either from some remote point or from computing and business machines as the result of their manipulations and computations.

Accordingly, it is a primary object of this invention to provide an electromagnetic printing apparatus capable of translating coded electric signals into typographical images.

Another object of this invention is to provide a high speed printer whose rapidity permits the translation of electronic signals without any delay.

A further object of the invention is to provide an improved type of magnetic head structure which permits heads to be mounted closely enough to record the magnetic images of whole characters in one single scan.

Further objects of the invention will become apparent from the following specification in conjunction with the accompanying figures in which:

FIGURE 1 is a perspective view of a multiple gap electromagnetic recording head;

FIGURE 2 is a perspective and, in part, exploded view illustrating another type of a multiple gap electromagnetic recording head;

FIGURE 3 is a perspective view of a recording apparatus utilizing the device either shown in FIGURE 1 or in FIGURE 2;

FIGURE 5 is a perspective view illustrating a method of obtaining prints from the image receiving member of the recording apparatus shown in FIGURE 3;

Figure 9:
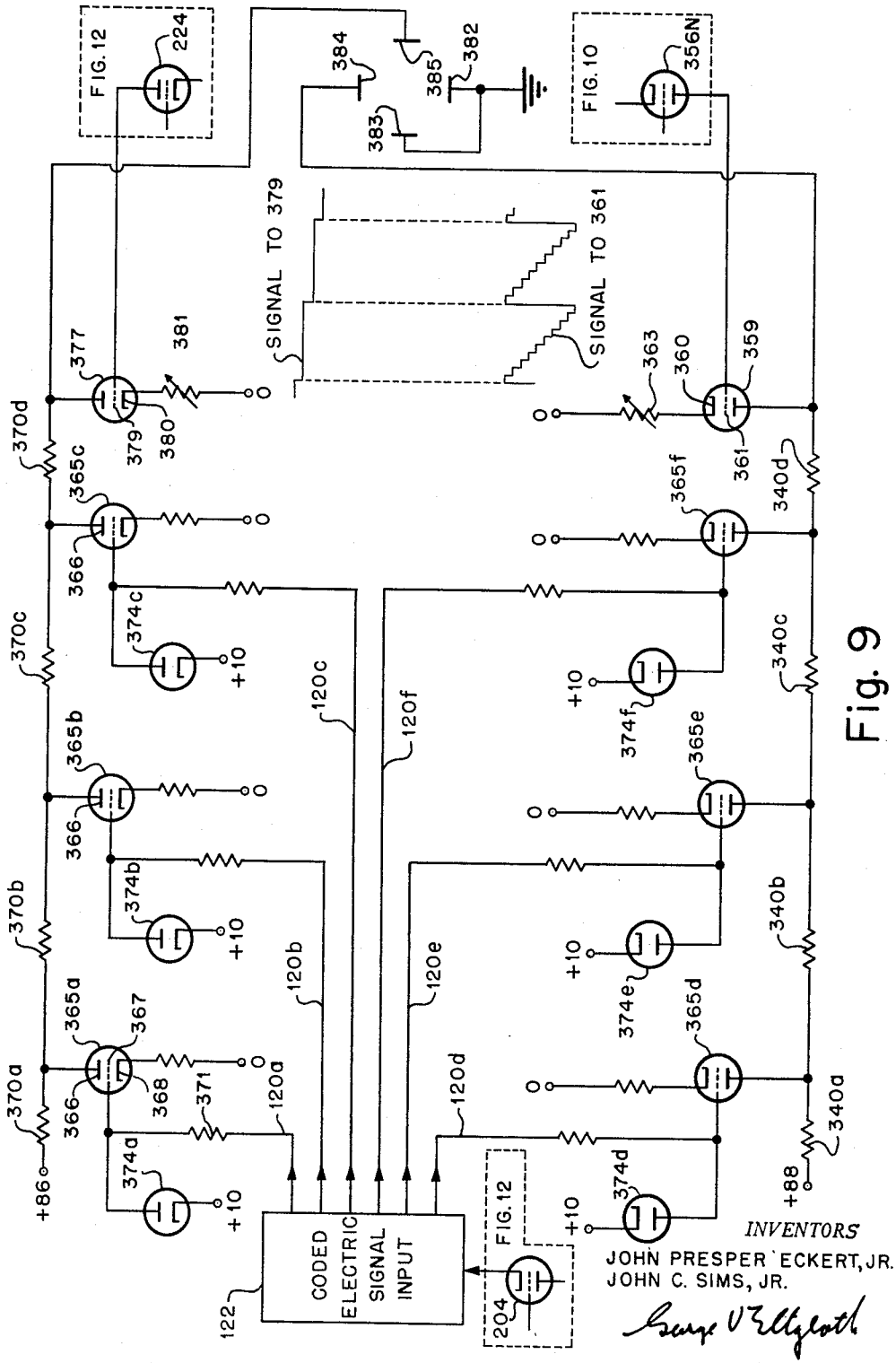
Figure 10:
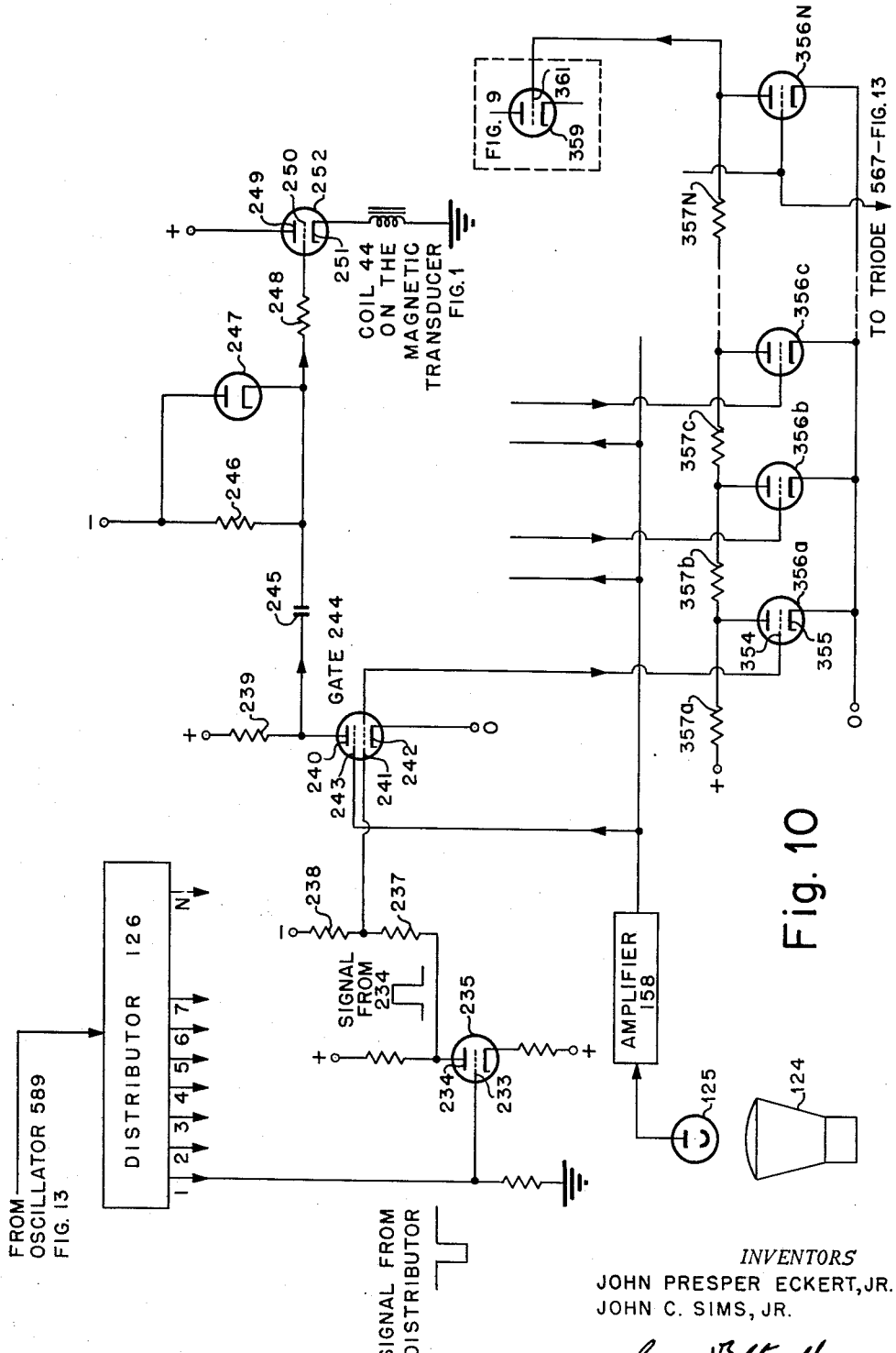
Figure 13:
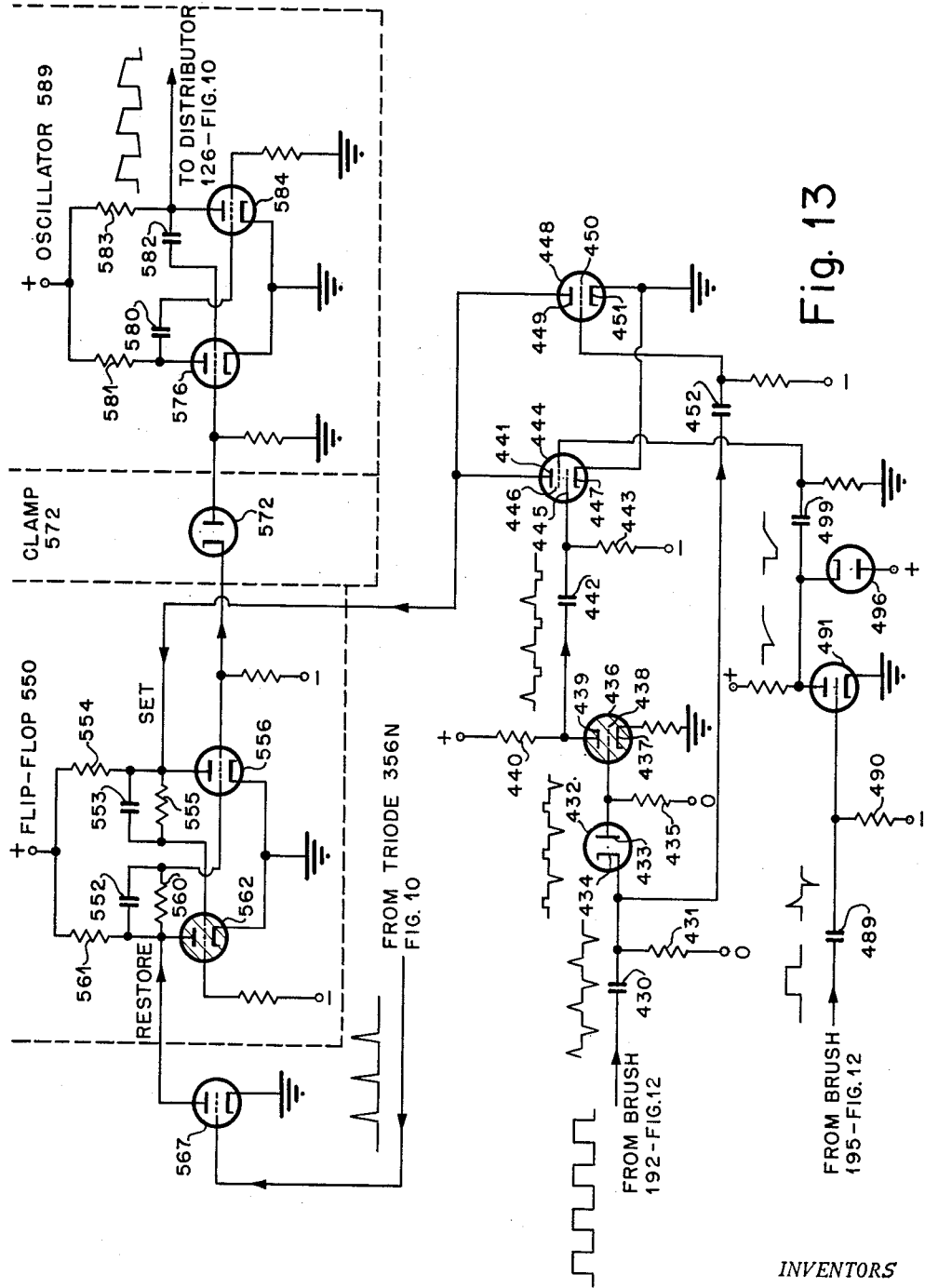
Figure 14:
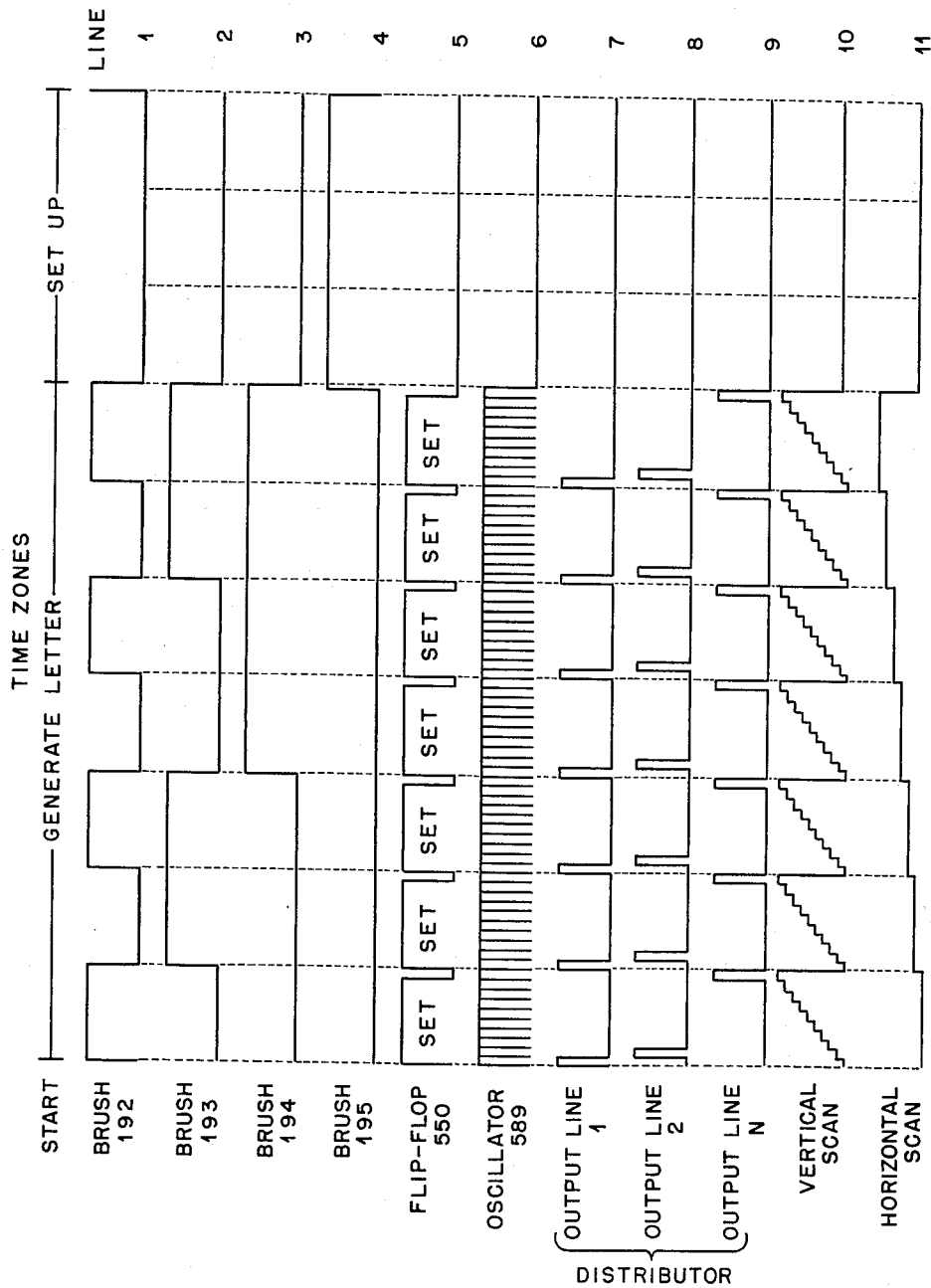

FIGURE 7 gives a side view of a cathode ray tube for use in connection with the invention and a front view of the face of such a tube;

FIGURE 8 is an enlarged view of a selected part of the face of the cathode ray tube;

FIGURE 9 illustrates schematically the circuits for positioning and deflecting the cathode ray beam;

FIGURE 10 shows partly schematically and partly in block diagram the circuits for energizing the coils on the electromagnetic head;

FIGURE 11 illustrates a perspective view of a timing disc connected to the image receiving member of the recording apparatus;

FIGURE 11A gives a fragmentary front view of such a timing disc;

FIGURE 12 shows schematically the circuits which are energized in connection with the rotation of said timing disc;

FIGURE 13 is a schematic representation of the circuits used for obtaining overall synchronization of signal distribution and operation; and FIGURE 14 gives a diagram illustrating the time relationship of the various signals produced in the operation of the electromagnetic recording device.

Like reference characters identify like parts throughout. For convenient reference, all voltage supply buses bear reference characters corresponding to their operating supply potential. An odd number indicates a negative supply potential, an even number a positive supply potential.

Electromagnetic printing

FIGURE 1 shows a multiple gap electromagnetic head 40 which may be used in conjunction with a magnetic surface to develop letter shaped magnetic images. The head consists of a comb-like member 42 of high magnetic permeability, which might be made, for example, of soft iron, or the well known alloys such as those sold under the trademarks "Hypersil" or "Permalloy." The member 42 may be provided with a plurality of notches leaving gaps 43. For purpose of illustration, ten gaps 43 are shown. The portions of the member 42 corresponding to the respective gaps 43 may be wound with separate energizing coils 44. The leads 45 from the ends of said separte energizing coils 44 are connected in proper combinations to a suitable letter forming signal source. In response to the various excitation patterns derived from this letter forming signal source, any combination of energizing coils 44 may be activated. The number of turns per coil 44 and the electric current required is dependent upon the material used in the printing cylinder 59 and the flux density required for proper magnetization on the surface of cylinder 59 (FIGURE 3).

FIGURE 2, in part in exploded view, represents a laminated type electromagnetic recording head 82 which may be used in place of the comb-type electromagnetic recording head 40 shown in FIGURE 1. This ganged magnetic transducer comprises alternating laminations of relatively diamagnetic conductors and relatively paramagnetic dielectrics. Accordingly, the head is built of copper conductors 84 interspaced and laminated between soft iron spacers 83 of a material similar to comb 42. Each copper conductor 84 contains at its two outer extremities holes 85 to which leads may be attached and connected to a letter forming signal source. All but one of the soft iron spacers 83 show a protrusion 83A. After the spacers 83 and conductors 84 are laminated together, the spacers 83 will be in contact with one another through these protrusions and provide the means for a complete magnetic path. It should be obvious that no such protrusion 83A is required on the first spacer 83.

The laminated type ganged head 82 may be used as a substitute for the comb-type head 40, the individual copper conductor 84 on head 82 performing the function of the individual coil 44 on head 40.

The head 40 is mounted on a head adapter 56 which in turn is attached to an arm 57 fixed to a block 58, as shown in FIGURE 3. It reposes on, or slightly above, a magnetic cylinder 59, and by the method previously described in the pending application Serial Number 221,362, is translated parallel to the axis of the cylinder 59. As a result of the rotation of the cylinder and the linear motion of the head, information elements are recorded in a helical path 60. The width of the helical recording 60 is determined by the width of the ganged head 40 from its topmost gap $43_1$ to its bottom most gap $43N_1$. This same width determines the height of the characters 61.

It should be noted that helical recording lines are produced because of the linear motion of the head in relation to the rotation of the cylinder. The head, instead of being given a smooth linear motion, could have an intermittent linear motion. That is, the head would move linearly one unit after each revolution of the cylinder, where a unit would correspond to the height of the characters recorded plus the spacing desired between recorded lines. As a result, the lines of recording on the cylinder would no longer be at the helix angle, but would run parallel or perpendicular, as the case may be, to the axis of the cylinder.

If the recording is made at the helix angle, the need arises to place the lines which form the shape of the individual characters at the same angle, so that these character lines appear parallel or perpendicular to the recording line. To this end, the magnetic head may be placed at an angle with the drum axis equal to the helix angle $\phi$, as indicated in FIGURE 3. Such a position of the head will ensure a proper position of the character lines in relation to the helical recording line. It is self-evident, however, that there could be numerous other arrangements to accomplish the same purpose.

Figure 4:
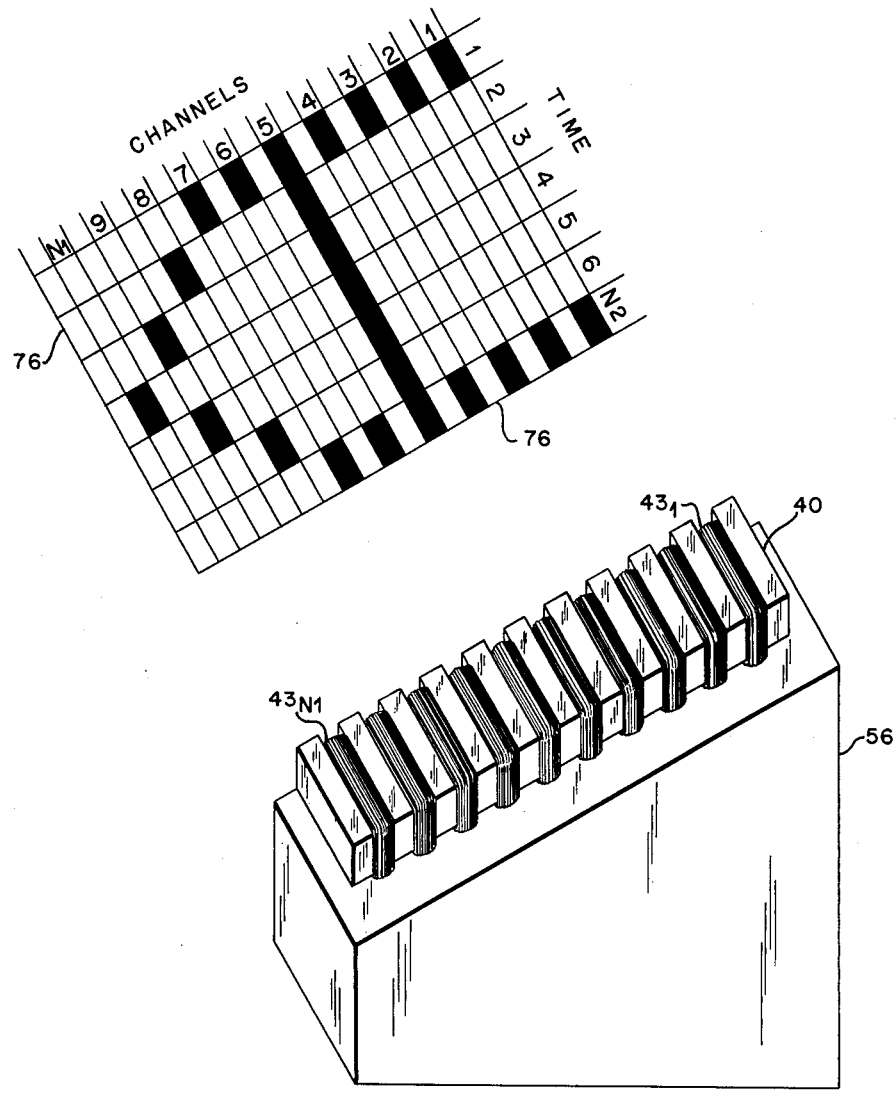
FIGURE 4 is a fragmentary perspective view illustrating the mode of operation of the recording apparatus shown in FIGURE 3.

Referring now both to FIGURES 3 and 4, the exact character desired is recorded upon the cylinder by having the correct gap 43 activated at the correct time in relation to the motion of the head and the rotation of the cylinder. More precisely, to record a given character "A," as shown in FIGURE 3 under 61, there may be considered to be superimposed upon this "A" a matrix or grid 76, where one axis of the grid is time and the other is the number of channels (FIGURE 4). The character to be recorded determines which channels shall be activated in a given time zone. Thus, it can be seen in the case of the letter "A" that in time zone number "one" gaps number "one," "two," "three," "four," "five," "six" and "seven" would be activated. As the cylinder rotates, time zone number "two" occurs, and gaps number "five" and number "eight" are activated. In time zone number "three" the cylinder has again rotated slightly, and gaps number "five" and number "nine" are activated. For the crossbar of letter "A" gap number "five" would remain activated from time zone number "one" to time zone number "$N_2$."

The number of gaps 43 within a given width or distance determine the proximity of the graphic spots which compose the character outlines in the final print. It is, therefore, a compromise between the degree of definition desired in the resulting print and the cost of forming and operating the gaps 43 that leads to the decision of how many gaps are to be provided. An inspection of FIGURE 4 makes it evident that the height of the recorded character is in accordance with the width across the head from its left-most gap $43N_1$ to the gap $43N_1$ at its extreme right.

Special attention should be given to the direction of the flux lines which are produced by each of the magnetic transducers of the head. The projections of these flux lines upon the magnetic cylinder (FIGURE 3) are parallel to the channel axis of the superimposed grid 76 and perpendicular to its time axis (FIGURE 4). This ensures a proper placing of the magnetic ink which, as has been explained in the earlier application Ser. No. 221,362, can be expected to adhere only to the poles of the magnets. If the position of the transducers and their flux lines were rotated by 90 degrees, a similar adhesion effect could be obtained only through application of modulated carrier waves. The positioning of the transducers and their flux lines eliminates, therefore, the need for the use of such modulated carrier waves and, thus, simplifies the circuitry involved.

In order to produce a final print in which the writing is in horizontal lines, the paper is fed tangentially to the cylinder 59 at an angle $\phi$ equal to the helix angle $\phi$, as shown in FIGURE 5. Thus, straight lines of print are produced on the paper. This is the difference between the printing process disclosed in the earlier application Serial Number 221,362 and the one described here. Otherwise, all other details of the printing process shown in the earlier application, such as powder dusting, color printing and so on, are equally applicable here.

It should be stressed that, although the recording appears in parallel lines of information on the cylinder 59 at the helix angle $\phi$, these lines do not form one continuous path. Whenever the final print is supposed to shift from one line to the next, a corresponding interruption of the path formed by the helical lines on the cylinder is necessary, as will be easily understood. As to the spacing of the lines in the final print, it follows the spacing of the lines on the cylinder.

Means for rotating the cylinder, for moving the magnetic head along the cylinder and for feeding the printing paper as well as means for the synchronization of such motions are known. Any of the known devices may be used for the aforementioned purposes without specific explanation.

*The interrelationship of circuits and functions*

The specification has dealt so far with the printing process as such, and with the electromagnetic and mechanical means used for this purpose. The remainder of the specification shall describe and explain the various component parts and circuits which connect the coded signal input terminal to the electromagnetic recording apparatus and which regulate the operation of the device.

Figure 6:
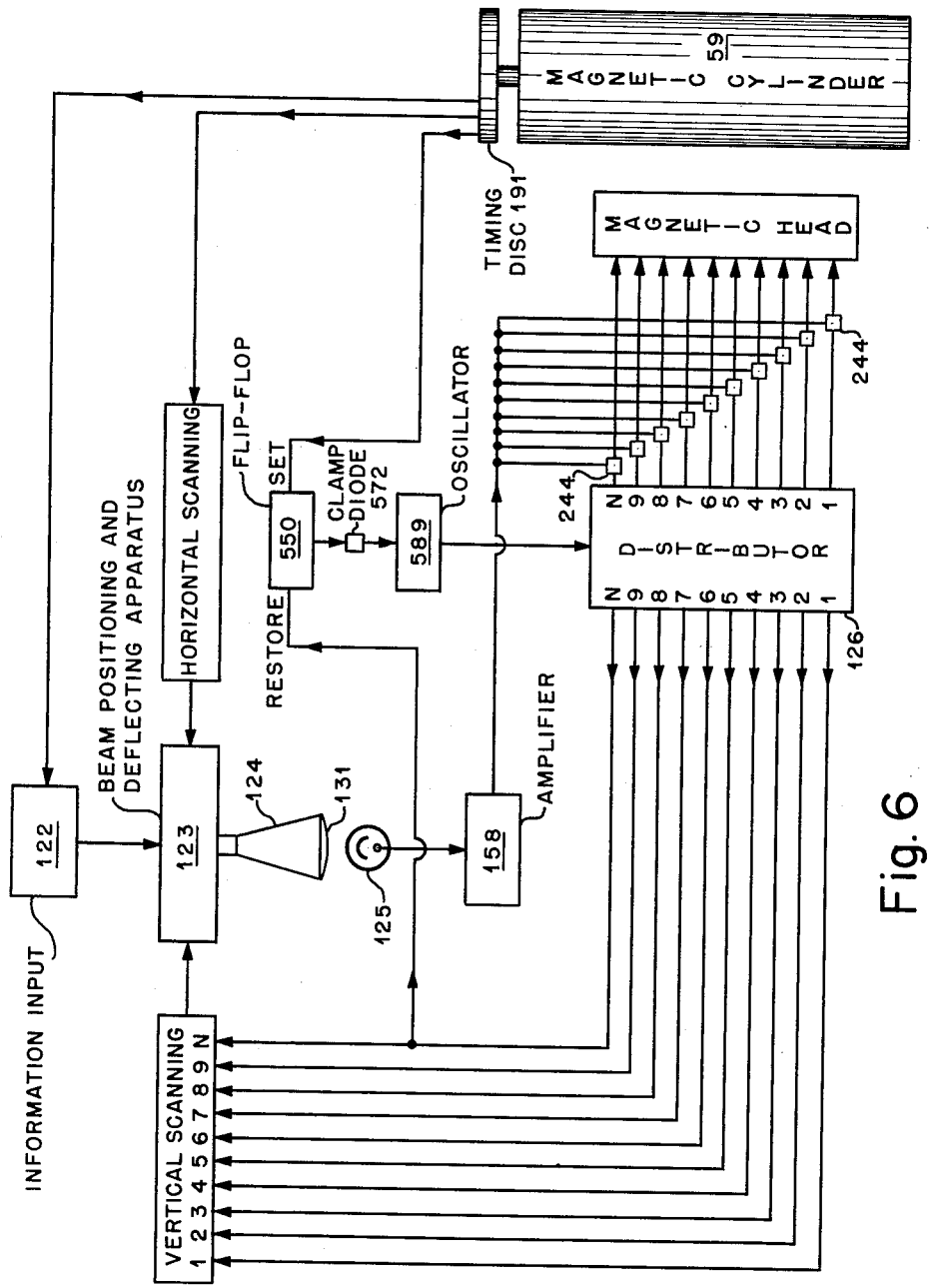
FIGURE 6 is a block diagram of various component parts and circuits connecting a coded signal input to the recording apparatus.

FIGURE 6 is a block diagram of these various component parts and circuits. There are two kinds of signals and pulses, the information signals which are transmitted to the apparatus from some outside source, and the driving pulses which are produced through the rotation of timing disc 191. The information signals are originally received in form of coded electric signals at the information input 122 and from there transmitted to the beam positioning and deflecting apparatus 123 (FIGURE 9). As a primary effect of the operation of this apparatus, the electron beam in the cathode ray tube 124 is deflected to the area occupied by a specific character on the tube's face 131, which operation will be discussed in connection with FIGURE 7.

As soon as this primary effect is accomplished, the scanning of the specific character begins (FIGURE 8). The vertical motion within this scanning process is caused by the operation of the vertical scanning circuits, shown on the right side bottom of FIGURE 10, from which pulses are sent into the beam deflection circuits 123 (FIGURE 9). The horizontal motion within the scanning process is brought about by the operation of the horizontal scanning circuits, illustrated in FIGURE 12, which likewise send pulses into the aforementioned beam deflection circuits.

The driving pulses which are produced through the rotation of timing disc 191 (FIGURES 11 and 11A) are used to initiate the individual horizontal scanning steps (FIGURE 12), to set the flip-flop circuit 550 (FIGURE 13) and to cause the transmission of a new set of information signals from the information input 122 as soon as the last set of such signals has been transformed into print. The flip-flop circuit 550 stimulates, when set, the oscillator circuit 589 to emit for every individual driving pulse which initiates a horizontal scanning step a number of clock pulses. The number of these clock pulses may be, preferably, equal to the number of vertical scanning steps to be performed within one single horizontal position and also equal to the number of channels on the magnetic transducer. The clock pulses are consecutively distributed by distributor 126 among a corresponding number of output lines leading both to the vertical scanning circuits and to the individual channels on the magnetic transducer (FIGURE 10).

Any light emissions from the cathode ray tube are observed by the photocell 125. The signals emanating from the photocell are then amplified by the amplifier circuit 158 and travel to the second inputs of all gates 244 which form a part of the output circuits of distributor 126. They pass through these gates only when there is a coincidence of signals coming both from the photocell and from the distributor, the second group of signals arriving at the first input to these gates. These signals are then applied to the coils on the magnetic transducer which, in turn, magnetizes the surface of the magnetic cylinder 59.

The characters on the face of the tube

FIGURE 7 gives a side view of the cathode ray tube 124 and a front view of its face 131 upon which various characters 128 have been applied. Such application may be either directly to the face itself or to a stencil which could be fitted over the face. In the latter case, it would be quite easy to remove the stencil and rearrange the characters in any desired form and order before putting it back again.

There are two ways of presenting these characters. Either the characters may be opaque in comparison with the background or vice versa. It also may be possible to use fluorescent material either for the characters or for the background. In either case the difference between black and white or between dark and light spots will be observed by the photo-electric cell 125 which would send the corresponding signals to the recording apparatus.

It should also be noted that the application of fluorescent paint either to the characters or to the background will create two areas of different sticking potential, because there would be a greater flow of secondary electrons from the fluorescent area than from the plain glass area. It might be possible, therefore, to eliminate the photocell and place, instead, a screened capacitor over the face of the tube. Such a device could be used, as is well known to anyone versed in the art, to detect the variations in voltage due to the variations in sticking potentials and to emit the signals which, otherwise, would be sent out by the photocell. It should be obvious that, for this purpose, any painting material other than fluorescent substance could be used which would give rise to a sticking potential different from that of plain glass.

In yet another method, the characters could be cut out of a sheet of conducting material and said sheet placed in the target area of the cathode ray beam. Through a suitable circuit a lead can be taken from said sheet and sent through an applicable amplifier to the distributor 126. Thus, during the scanning process signals would result from the background, but not from the character itself. Conversely, the characters could be composed of a conducting material, and not so the background. The characters could then be linked together, and any resulting signals from the scanning operation could be sent through an amplifier to the distributor 126.

It is to be understood that the characters on the face of the cathode ray tube are set up in the normal horizontal position. They are reproduced on cylinder 59 as a mirror image and rotated 90 degrees plus the helix angle $\phi$ due to the direction of scanning, the motion of the cylinder and the positioning and motion of the electro-magnetic head. During the printing operation indicated in FIGURE 5 the characters are reversed again and put back into the normal horizontal position on the printed paper, thus producing legible information.

FIGURE 8 represents an enlarged sample character "A" upon which, for purposes of explanation, a matrix or grid 129 is assumed to be superimposed. Said grid 129, similar to grid 76 shown in FIGURE 4, has time as one axis and channel numbers as the other. A cathode ray beam is then caused, by the action of the beam positioning and scanning apparatus 123, to scan the "A" by first passing in time zone number "one" from channel number "one" to channel number "$N_1$," then advancing to time zone number "two," by passing from channel number "one" to channel number "$N_1$," then advancing to time zone number "three" and so on to time zone number "$N_2$."

The modulated light is observed by the photo-electric cell 125, and the resulting signals, which denote either a black spot or a white spot, are transmitted through amplifier 158 to the gates 244 in the output circuits of distributor 126 (FIGURE 10).

It should be noted that, for best results, the characters which are applied to the face of cathode ray tube 124 should be of such a shape as to best conform to the assumed grid 129. This will give rise to smoother and more uniform characters in the resulting magnetic recording on cylinder 59. It should further be noted, that the movement of the cathode ray beam from one time zone to another is synchronized with the rotation of this cylinder. The movement of the cathode ray beam within a given time zone to all the channels is assumed to constitute one time unit while the corresponding sweep within the subsequent time zone is considered to be another time unit. The number of time zones, of which a character may be composed is predetermined and derived from a compromise between the precision desired and the limitations and cost of the equipment necessary to perform the task. It has been found that the use of not less than about 100 time zones per inch leads to advantageous results.

Deflection and scanning

A method of positioning a beam within a cathode ray tube was disclosed in the pending application—Serial Number 98,178—of Messrs. John Presper Eckert, Jr. and Herman Lukoff, filed on June 10, 1949 now Pat. No. 2,969,478. Its practical application, for the purposes of this invention, is shown in FIGURE 9.

In this method, a combination, for example, of six possible signals is used to determine the beam position desired. That is, each different combination of these six signals represents a specific character. The first three signals—the top three signals in the example of FIGURE 9—deflect the cathode ray beam in a horizontal direction, and the last three signals—the bottom three signals in the example—deflect the beam in a vertical direction. As a result, a different and independent position is allocated to each character. There is no danger that two different characters would possess the same location on the face of the tube, since no two characters possess the same combination of signals.

The beam positioning and deflecting circuits as well as the horizontal and the vertical scanning circuits are operated upon the same principles. In each case, resistors are arranged in series and used to produce predetermined voltage drops, if and when a valve assigned to each individual resistor begins to operate. First, such voltage drops are used to selectively deflect the cathode ray beam, both horizontally and vertically, from its original position (FIGURE 9). In the same way, the grid potentials in the horizontal scanning tube 377 and in the vertical scanning tube 359 are gradually decreased, due to the increasing voltage drops occurring within the resistor arrangements shown in FIGURES 10 and 12, respectively. As a result of this decrease in grid potential, both scanning tubes draw less and less current from their respective positive potential supply terminals 86 and 88, thus gradually decreasing in very small degrees the already existing voltage drop within the resistor arrangements shown both on top and at the bottom of FIGURE 9. The effect of this gradual decrease in the voltage drop is that the voltages both on the horizontal and vertical beam deflection plates 385 and 384 gradually increase in very small degrees and cause the beam to sweep in a direction which is opposite to the direction of increasing deflection. Scanning consists, therefore, in a gradual reduction of deflection in intermediate steps, thus producing a gradual and partial retrogression of the beam through a plurality of intermediate positions.

The circuit for obtaining horizontal deflection of the beam is shown in the top half of FIGURE 9 while a practically similar circuit for obtaining vertical deflection is illustrated in the bottom half of the diagram. Through each of the six input lines 120a to f either a positive or a negative signal is sent, depending upon the combination which determines the character. For purposes of explanation, a positive signal will be assumed to have a plus 20 volt potential while a negative signal is assumed to have a minus 11 volt potential. The signal from the first input line 120a may be sent through a resistor 371 to the signal input grid 367 of triode 365a and also to the anode of diode 374a. The cathode 368 of said triode 365a is linked through a resistor to a zero potential terminal, while the cathode of said diode 374a is linked to a plus 10 volt potential.

If a negative potential is sent through input line 120a, the minus 11 volt potential will have no effect upon diode 374a, nor will it cause triode 365a to operate. Similarly, there will be no effect on diode 374b and triode 365b or on diode 374c and triode 365c, if a negative signal is arriving through input lines 120b and 120c, respectively.

Assuming now that all three signals coming through input lines 120a, 120b and 120c are negative, then none of the three triodes 365a, 365b and 365c will operate. In consequence, none of these three triodes will draw any current from the positive potential terminal 86 and thereby cause a voltage drop across the resistors 370a, 370b, etc. Under this condition, and provided, that triode 377 is not operating, the electron beam of the cathode ray tube may be deflected to any desired position at the extreme right of the face of the tube. This may be accomplished through the application of an appropriate voltage to terminal 86 and from there to the horizontal deflection plate 385. Any voltage drop or combination of voltage drops, on the other hand, will result in a lesser degree of deflection. Such a voltage drop or voltage drops may be brought about by the arrival of positive signals in the input lines 120a, 120b and 120c.

If the signal arriving in input line 120a is positive, and, more specifically, plus 20 volts, as stated hereinabove, diode 374a will operate and cause a plus 10 volt potential to be impressed on input grid 367 of triode 365a which action will cause said triode to operate. As soon as this triode operates, it draws current through its anode 366 from terminal 86, resulting in a voltage drop across resistance 370a. Thus, the operation of triode 365a will always cause this voltage drop which also will always be of the same value, due to the limiting influence of diode 374a.

In a similar manner the triode 365b will be caused to operate whenever a positive signal arrives through input line 120b. In this case, however, the anode 366 of triode 365b is connected to the positive potential terminal 86 through resistor 370a plus resistor 370b, thus creating a greater voltage drop than was caused by the operation of triode 365a. It can similarly be seen that a positive signal in input line 120c will, through the consequent operation of triode 365c, cause a still larger drop across resistors 370a, 370b and 370c in the line connecting positive potential terminal 86 and deflection plate 385.

The distance between horizontal deflection plates 385 and 383 may be subdivided into eight segments. The value of the resistors 370a, 370b and 370c can be so chosen that the operation of triodes 365a, 365b and 365c, either singly or in combination, will produce the following results: If neither one of these tubes operates, the beam will be in the original position. If triode 365a operates, the signal impressed upon deflection plate 385 will be such as to move the beam $2^0$ or 1 unit to the left. If triode 365b operates, the beam will move $2^1$ or 2 units from the original position. If both triodes 365a and 365b operate, the beam will move $2^0$ plus $2^1$ or 3 units from the original position. If triode 365c operates, the beam will move $2^2$ or 4 units from the original position. Similarly, the operation of valves 365a and 365c will result in a motion of $2^0$ plus $2^2$ or 5 units, the operation of valves 365b and 365c will produce a motion of $2^1$ plus $2^2$ or 6 units, and the operation of tubes 365a, 365b and 365c will result in a motion of $2^0$ plus $2^1$ plus $2^2$ or 7 units. This arrangement makes it possible to use eight different horizontal positions on the face of the cathode ray tube 124 where the individual characters may be placed.

Due to the symmetry of the circuits connected to the first three input lines and those connected to the other three input lines we can, by using the last or bottom three input lines 120d, 120e and 120f, cause the beam to move to any one of eight vertical positions. Thus, there are eight times eight or sixty-four locations on the face of the cathode ray tube 124 to be allocated to the individual characters. The position of any specific character is dictated by the combination of six signals that represent this character in the code. Once these sixty-four locations are determined, the graphic representations of the respective individual characters are placed slightly to the right and slightly above these locations. That is, as shown in FIGURE 8, the original beam position for a given character corresponds to the zero-zero position on the assumed grid 129.

Once the original beam position is secured, the next process is to scan the character. This is accomplished by triode 359 in the vertical deflection circuit and by triode 377 in the horizontal deflection circuit. Triode 359 causes the vertical scanning due to the action of an incoming signal, similar to the one shown above the input line, to grid 361. This signal operates triode 359 in such a manner as to cause successively lower voltage drops across the series resistors 340a, 340b, 340c and 340d. As a result, the cathode ray beam rises slightly with each successively lower voltage drop. The total amount of the beam rise during scanning is equal to the height of a standard character 128 as applied to the face of the tube. The rise is also caused to occur in $N_1$ steps, the information scanned in each step being transmitted, in the manner previously discussed, to the corresponding gap on the magnetic head. When the $N_1$th or last step is reached, the signal is removed and the beam drops correspondingly to the original level at which it was, before the signal was applied. The cathode 360 of said triode 359 is connected to a zero potential terminal through resistor 363 which is variable for purposes of scanning adjustment.

While this is occurring, triode 377 in the horizontal deflection circuit is receiving a signal, similar to the one shown below the input line, to its grid 379. The cathode 380 of this triode is similarly connected to a zero potential terminal through variable resistor 381, said resistor being used for scanning adjustment purposes. This signal causes consecutively lower voltage drops across the series resistors 370a, 370b, 370c and 370d which, in turn, cause the beam to move in small steps in the rightward direction. The total horizontal distance moved during scanning is equal to the width of a standard character 128 as applied to the face of the tube. Furthermore, it is accomplished in $N_2$ steps, each step occurring in one corresponding time zone, as was previously discussed. It should be noted, that the horizontal rightward beam movement does not occur until after the beam has reached the $N_1$th step in its vertical climb.

Thus, in any given square or rectangle allotted to any individual character on the face of the tube, the cathode ray beam will start at the bottom left hand corner and rise vertically to the top of the square; the beam will then drop back to the bottom of the square, be displaced slightly to the right and then again rise vertically to the top of the square at which time it will again drop down and be displaced slightly to the right before beginning its next climb. This will continue until the entire square has been scanned.

*Vertical scanning*

FIGURE 10 illustrates schematically and partly in block diagram circuits which may be used both to energize the selected coils on the magnetic head and to operate the triode 359 which, in turn, supervises the vertical scanning action of the beam in the cathode ray tube.

The distributor 126 emits signals which are sent out in consecutive order from output lines "one" to "N". Thus, only one output line is transmitting a signal at a time. The number of output lines N is equal to the number of channels on the assumed grids 76 and 129 which also equals the number of gaps provided in the magnetic head.

The consecutive signal distribution from output lines "one" to "N" is synchronized with the vertical sweep of the cathode ray beam within a given time zone. The time involved in going from output line "N" back to output line "one" is synchronized to occur slightly before or just during the time involved in going from one given time zone to the next time zone on the assumed grids 76 and 129. Furthermore, both these actions are in turn synchronized with the rotation of the cylinder 59 and with the linear motion of the magnetic head.

All output lines from the distributor 126 involve similar circuits but, for the sake of simplicity, only the complete circuit for the first output line is shown.

The signal from output line "one"—as depicted to the left of output line "one"—is fed to the input grid 233 of triode 235, said input grid being returned through a resistor to ground. The anode 234 of said triode 235 is connected through a resistor to a suitable positive potential terminal. In a similar manner, the cathode is connected to a suitable positive potential terminal through a third resistor. The resulting signal which is now reversed—as depicted above the anode output line of triode 235—is sent through a suitable resistor 237 to the first control electrode 241 of gate 244. Said first control electrode 241 is connected to a negative potential terminal through resistor 238. The cathode 242 of said gate 244 is linked directely to a zero potential terminal while the anode 240 is connected to a suitable positive voltage through resistor 239.

The signals which are produced by the photo-electric cell 125 are simultaneously sent through amplifier 158 to the second control electrodes 243 of the gates 244 in each of the output line circuits of the distributor 126. These gates in the different output line circuits will, however, not conduct unless a positive gating signal is also present upon their first control electrodes. Since the signal to the first control electrode is sent out by the distributor 126 consecutively into the output lines "one" to "N," the signals from the photo-electric cell 125, which result from the vertical scanning of a character on the cathode ray tube 124, will be passed just as consecutively through these gates.

If, for the purpose of explanation, the number N is considered to be equal to 10, then the following series of events will occur:

(1) The beam of the cathode ray tube will vertically scan a given segment (i.e. within a given time zone) of a character in ten even steps.

(2) The photo-electric cell 125 will observe this scanning and send signals through amplifier 158 to the second control electrodes of the ten gates 244, one gate 244 existing in each of the ten output line circuits of the distributor 126. The signals which the photoelectric cell sends out substantially represent either a black spot or a white spot.

(3) At the same time that the photo-electric cell emits its first of the ten information signals, the distributor will send a gating pulse to the first control electrode of gate 244 in the first output line circuit, allowing the information signal to pass through the gate of output line "one," and of output line "one" only. Then, when the photo-electric cell emits its second signal, the distributor will activate the first control electrode of gate 244 in output line "two," thus permitting the information signal to pass through the gate of output line "two." In this way, the ten information signals will be distributed consecutively among the ten output lines.

(4) Each output line circuit is connected in a suitable manner to one of the ten coils 44 which exist on the magnetic head. Thus, having passed the gate 244, the signal energizes the coil in the corresponding channel of the head. As a result, a magnetic dot is produced in sequence on the previously described cylinder 59 for every black spot observed by the photo-electric cell as the beam of the cathode ray tube makes one vertical sweep.

After leaving the anode 240 of the selected gate 244, the information signal is sent through capacitor 245 to resistor 246. Said resistor 246 terminates at a suitable negative potential. Diode 247 acts as a D.C. restorer to keep the signal at the desired voltage level by preventing the average voltage from shifting in the presence of an unsymmetrical wave. The anode of said diode 247 terminates at the same negative potential terminal as does resistor 246. The signal is then sent through resistor 248 to the input grid 250 of the power tube 252. The anode 249 of said power tube 252 is linked to a suitable positive potential terminal while the cathode 251 is connected through coil 44 on the magnetic head to ground.

The very same gating pulse which consecutively activates the first control electrodes 241 of the gates 244 in each of the individual output line circuits also activates consecutively the input grids 354 of triodes 356, one of which exists in connection with each individual output line circuit, as also shown in FIGURE 10. These triodes 356 are used to operate the aforementioned triode 359 (FIGURE 9) which, in turn, supervises the vertical scanning action of the beam in the cathode ray tube.

The cathodes 355 of all N triodes 356 are connected to a zero potential terminal while the anodes are connected through suitable resistors 357 to a positive potential terminal and also to the input grid 361 of the triode 359. When the first output line is operated, a signal is sent to the input control grid 354 of triode 356a. The triode 356a then operates with a resulting voltage drop across the resistor 357a which action sends, at the same time, a signal to the input grid 361 of triode 359. By the action of the distributor 126, the second output line circuit will next be operated and a signal sent to the corresponding input grid of triode 356b. In this case, however, a higher voltage drop will result, due to the action of the additional resistor 357b and, thus, a correspondingly lower voltage will arrive at the input grid of triode 359. As each one of the triodes 356 is operated successively, there will be higher voltage drops and accordingly lower voltages at the input grid of triode 359. In this way, the desired signals are sent to triode 359 not only to cause the vertical scanning action, but the scanning operation itself is also synchronized with the action of the distributor 126, so that any information observed by the photo-electric cell 125 during the scanning operation will always be sent to the correct and corresponding channel 43 on the magnetic head.

*Horizontal scanning*

FIGURE 11 illustrates a timing disc 191 which may be attached to the same shaft 190 to which the magnetizable cylinder 59 is fixed. Said disc 191 contains at its outer extremities three circuit lines 196, 197, and 198, as indicated in FIGURE 11A, each of them being grounded in a suitable manner through a fourth circuit line and brush 187. Two columns of contacts 180 and 181 are connected to the circuit line 196, while one column of such contacts 182 and 183, respectively, is attached to circuit lines 197 and 198, respectively. There are four brushes 192, 193, 194, and 195 to make connections to the columns of contacts 180, 181, 182, and 183, respectively, as the disc rotates.

The contacts in these columns are arranged in repetitive groups along the circumferential lines 196, 197, and 198, each group comprising an equal number of rows as, for example, ten rows in the given illustration. The space occupied by any one such group along the circumferential lines on the cylinder represents the distance required for the printing of the width of a character plus the space desired between this and the subsequent character. The first seven rows of contacts, which occur in columns 180, 181, and 182, cause the horizontal scanning operation to develop in seven equal steps, while the last contact which is three rows long and occurs in column 183, is used both to supply the necessary spacing between subsequent characters and to send a signal to the information source 122 to set up the signals for the next character. It should be remembered that, for purposes of explanation, the number of time zone $N_2$ on both assumed grids 76 and 129 has been chosen equal to seven. This, however, is not a limiting case.

It should further be noted that the repetitive groups of contacts do not occur continuously around the circuit lines 196, 197, and 198. A suitable vacant space is necessary in order that the resulting magnetic printing will not occur in a continuous helix on the cylinder 59. The reason for desiring this was explained in the previously discussed method of print transfer.

The circuits required in connection with the operation of the timing disc 191 are shown in FIGURE 12. The brushes 192, 193, and 194 are connected, respectively, to input grids 212, 219, and 226 of triodes 210, 217, and 224. Said grids 212, 219, and 226 are each returned to a minus 21 voltage potential through their respective resistors 209, 216, and 223. The cathodes 213, 220, and 227 of triodes 210, 217, and 224 are returned to ground through their respective cathode resistors.

Due to the positioning of the contacts shown in FIGURE 11A it can be seen that, as the disc rotates counterclockwise, brush 192 will first make connection with a contact in column 180. Since all contacts are at ground potential, a signal will result on the signal input grid 212 of triode 210 and cause the triode to conduct. The anode of said triode 210 is connected to a positive potential terminal through resistor 215a and also to the signal input grid 379 of the aforementioned triode 377 which, in turn, supervises the horizontal scanning action of the beam in the cathode ray tube (FIGURE 9). Thus, operation of triode 210 will cause a voltage drop across resistor 215a, and an appropriate signal will be sent to the input grid 379 of triode 377.

The next connection with a contact will be made by brush 193. This, in turn, will cause triode 217 to operate with a resulting voltage drop across resistances 215a and 215b. After this, both brushes 192 and 193 will make connections, and next, only brush 194 will make contact. This is followed by combinations of brushes 192 and 194, 193 and 194, and 192 and 193 and 194.

The value of the resistors 215a, 215b and 215c can be so chosen that the operation of triodes 210, 217 and 224, either singly or in combination, will result in seven different forms of voltage drops, as was previously explained in connection with the horizontal deflection circuits. These gradually increasing voltage drops will lead, in turn, to a gradual decrease in the grid potential of the horizontal scanning tube 377, the effect of which has already been discussed hereinabove in reference to FIGURE 9.

Only the first seven rows of contacts, in a given group of ten rows, are used to produce the horizontal scanning action in the cathode ray tube. After the seventh row of contacts has passed the brushes 192, 193 and 194, the contact in column 183 which is three rows long will connect only with brush 195. Said brush 195 is connected to a minus 21 voltage potential through register 200. Upon connection of brush 195, the resulting signal is sent through a differentiating capacitor 201 to the input grid 206 of triode 204. Both the capacitor 201 and the input grid 206 are connected to a minus 21 voltage potential through resistor 202. The anode of said triode 204 is connected to a positive potential terminal while the cathode is connected through a resistor to ground. Thus, at the first connection of brush 195 with the contact in column 183, a sharp positive cathode signal will be sent and, when the brush breaks connection with this contact, a sharp negative cathode signal will result. Since no scanning occurs during the passing of the last three rows, a proportional space will be effected on the surface of the cylinder 59 without any magnetic printing. This distance represents the space between the characters to be recorded. The sharp positive and negative cathode signals are sent to the information source 122 shown in FIGURE 9. The first positive pulse causes the apparatus 122 to remove the combination of signals which represents the character just scanned and also to set up the signal combination which represents the next character to be printed. The following negative pulse causes the apparatus to emit the new signal combination. Thus, time is provided, equal to the time necessary for three rows of contacts to pass a given point, which is used to remove the cathode ray beam from the preceding character and to position the beam at the next character to be scanned.

*Synchronization*

FIGURE 13 represents a circuit which may be used to synchronize the horizontal and vertical scanning operations. Some appropriate wave forms are shown above the segments of the circuit in which they occur.

The series of signals which is set to triode 210 from brush 192 in FIGURE 12 is also transmitted to one side of differentiating capacitor 430 in FIGURE 13. There is a positive signal from capacitor 430 whenever brush 192 connects to one of the contacts in column 180, and a negative signal whenever this brush disconnects (FIGURE 11A). Since there are four such contacts within each repetitive group of column 180, capacitor 430 emits four positive and four negative signals during the passage of any one of these groups.

The other side of capacitor 430 is linked to a zero potential terminal through a suitable resistor 431. The series of signals emanating from this capacitor is then directed into two paths. The negative signals of the series are effective on the cathode 434 of diode 432. The anode 433 of said diode is linked to a zero potential terminal through resistor 435 and also connected to the input grid 438 of triode 436. Said triode 436 has its cathode 437 linked through a resistor to ground potential and its anode 439 connected to a suitable positive potential terminal through resistor 440. The normally conducting triode 436 is shut off by the signal from diode 432, and the resulting signal is sent through anode 439 to the condenser 442. The other end of condenser 442 is linked to a negative potential terminal through resistor 443 and also to the first control electrode 445 of dual control grid tube 444. The cathode 447 of tube 444 is linked directly to ground potential. Thus, the signal which is sent out by diode 432 is amplified and reversed by triode 436, then, after passing through condenser 442, finally amplified and again reversed by tube 444.

This action of tube 444 occurs only when there is no blocking or opposing signal present on the second control electrode 446. Assuming for the instant that there is no opposing signal present on this second control electrode, the resulting negative signal is sent out through anode 441 into the "set" line of flip-flop circuit 550.

The positive signals in the aforementioned series, which were not accepted by diode 432, are, however, effective on triode 448. They are applied to its input grid 450 through a resistance-capacitance coupling arrangement including capacitor 452. The cathode 451 of said triode 448 is linked directly to ground potential while its anode 449 is connected through a suitable resistor 554 to a positive potential terminal. The positive signals arriving at said input grid 450 are inverted and amplified and then applied to the "set" line of flip-flop circuit 550.

Thus, in the line connecting triode 448 and tube 444 with the flip-flop circuit 550, there occurs a series of consecutive negative signals. Each signal represents the fact that the cathode ray beam has moved horizontally from one time zone to another. Thus, the vertical scanning operation should begin at the arrival of one signal and be completed before the arrival of the next signal. This is accomplished by the flip-flop circuit 550 and the oscillator circuit 589, shown in FIGURE 13, as follows:

The negative signal sent either by tube 444 or by triode 448 sets the flip-flop. Thus, the triode 562, which is normally "on," is shut off by the incoming negative signal, and, consequently, triode 556 begins to conduct.

A signal, which results from the operation of said triode 556 is sent to the cathode of diode 572. The anode of said diode is connected through a resistor to ground potential and also to the input grid of triode 576 of the oscillator circuit 589. This circuit is of the conventional multivibrator type, its operation being dependent upon the operation of diode 572. Said clamp apparatus 572, when not operating, causes the oscillator circuit to stop in predetermined position, so that, when the diode 572 again operates and, thus, causes the circuit to function, the resulting signals to the distributor 126 will always start at the same position and follow the very same pattern. The main requirement for the oscillator apparatus is that it be fast enough to furnish the desired number of signals in the desired time. That is, from the time one negative pulse reaches the flip-flop circuit 550 until the time at which the next negative pulse arrives, the oscillator 589 must send out N signals, where, for our illustration, N equals ten. In this way, the tenth step in the vertical scanning process is assured of occurring before the cathode ray beam moves to the next horizontal position.

The last and final pulse emanating from the oscillator, which is the tenth pulse in the given example, is not only used, however, to initiate the last and final vertical scanning step, but serves also as the pulse which restores the flip-flop. It has been explained above that the signals from the oscillator circuit 589 are sent to the distributor 126 through which they are distributed consecutively among the N output lines and, thereby, cause the vertical scanning action as previously described. The signal which is allocated to the last and final output line arrives at the triode 356N in FIGURE 10 from which it brings the vertical scanning action to the topmost point desired. It is indicated both in FIGURE 6 and in FIGURE 10 that the same pulse which reaches the triode 356N is also sent to the input grid of triode 567, as shown in the upper left of FIGURE 13. The cathode of said triode is linked directly to ground potential while the anode is connected to a positive potential terminal through resistor 561. This resistor is, however, also a part of the flip-flop circuit 550. Thus, the operation of triode 567, by the action of the incoming signal, will cause the flip-flop circuit 550 to restore with the result that triode 556 ceases conducting, and, consequently, triode 562 begins to conduct. This action also causes diode 572 to stop conduction and, thus, also cuts off the oscillator. That condition remains until the arrival of the next pulse either from tube 444 or from triode 448, at which time the process repeats itself.

It has already been stated that the original series of signals coming from capacitor 430 consists of eight consecutive positive and negative pulses, the four negative pulses going to tube 444 and the four positive pulses going to triode 448. This would give rise to a total of eight pulses sent from tube 444 and triode 448 to the flip-flop circuit which, consequently, would establish eight rows (time zones) of the horizontal scanning process. Since only seven rows are desired, the last negative pulse must be removed before it reaches the flip-flop circuit. This is accomplished in the following manner:

For the first three negative pulses out of each group of four signals which are sent to the first control electrode 445 of tube 444 there is no opposing signal on the second control electrode 446, and the signals are, therefore, transmitted to the flip-flop circuit. Before the arrival of the fourth pulse, which represents the pulse to be removed, an opposing negative signal is sent to the second control electrode 446 which is large enough to completely block out the positive signal on the first control electrode. As a result, tube 444 will not operate, and no signal will be sent by anode 441 to the flip-flop circuit. Such a blocking signal can be obtained from brush 195 on the timing disc (FIGURES 11A and 12). This signal from brush 195 is sent through a differentiating circuit, as shown in the bottom section of FIGURE 13, which consists of a capacitor 489 and a resistor 490 connected to a negative potential terminal. The resulting signal is then transmitted to the input grid of triode 491, said grid being returned to a negative potential terminal through the aforementioned resistor 490. The cathode of said triode is linked directly to ground potential while the anode is connected through a resistor to a suitable positive potential terminal. Said triode 491 operates only upon receipt of a positive pulse. The resulting signal, which is inverted and amplified, is sent through the anode of this triode to the cathode of diode 496. The anode of diode 496 is connected to a positive potential terminal, the purpose of this being to cut off the signal at a desired level. The signal then proceeds to the pulse lengthening condenser 499. Said condenser 499 is connected through a resistor to ground potential and also linked to the second control electrode 446 of the aforementioned tube 444. In this way, when the negative signal is finally impressed upon the second control electrode 446, is is widened and occurs slightly before the positive signal activates the first control electrode 445, so that the positive signal will arrive during the duration of the widened negative signal. As a result, the final signal from capacitor 430 will be blocked out and tube 444 will not operate, and, thus, only the desired seven signals will arrive at the flip-flop circuit.

The contacts in column 183 are so placed on the timing disc 191 (FIGURE 11A) that they reach brush 195 before brush 192 loses connection with the fourth contact in column 180. As a result, the first signal from brush 195 is emitted before the final negative pulse leaves brush 192. This is necessary, if we are to be assured that the blocking signal from brush 195 will be present at the second control electrode of tube 444 before and while the final signal stimulated by brush 192 arrives at the first control electrode.

FIGURE 14 is a timing diagram of the complete process of scanning a given character. A review of this diagram shows the results of the synchronization of all the movements. Thus, the first three lines illustrate the pulses generated by the brushes 192, 193 and 194 which ultimately cause the horizontal scanning action to occur, as indicated in line eleven. Line four shows the pulse arriving from brush 195 just slightly before the end of the letter generation time to produce the blocking signal previously discussed and also to cause the coded information input terminal 122 to set up the signals for the next following character. Line five indicates the operation of flip-flop 550 which causes the oscillator circuit 589 to emit the ten vertical scanning signals (line six) during each individual horizontal position. Lines seven, eight and nine show, in part, how these ten signals are distributed by the distributor among the ten circuits which cause the vertical scanning. This corresponds to the distribution of the same ten pulses among the ten circuits leading to the ten channels on the magnetic transducer. Line ten shows, as the result, the vertical scanning action accomplished in ten consecutive steps. Line eleven illustrates the horizontal scanning operation accomplished in seven consecutive steps while the last three time units are used for the spacing between consecutive characters and to set up the signals for the next following character.

While a specific embodiment has been described in detail to illustrate the principles of the invention, many modifications and variations for applying such principles in other environments, but which do not depart materially from the spirit of the invention, will be apparent to those skilled in the art.

What is claimed is:

1. In a system for magnetically recording symbolic information, in combination, scanning means for scanning the symbol to be recorded along one line in one scanning direction, means for consecutively applying N clock pulses to said scanning means so as to produce N consecutive scanning steps along that line, each of said scanning steps covering a specific portion of said symbol, a rotatable magnetic recording medium, a plurality of magnetic heads arranged in one line and communicating with said recording medium at an angle skew to the axis of rotation thereof, said means for consecutively applying N clock pulses being also connected to said plurality of magnetic heads so as to consecutively and separately render each head operable in synchronism with said scanning steps, a pick-up means associated with said scanning means for developing electrical signals characteristic of the intelligence in the symbol portion being scanned, means for applying said signals to said magnetic heads, means synchronized with the rotation of said recording medium for displacing said scanning means in a direction at right angles to said one scanning direction so as to inaugurate a new series of N consecutive scanning steps along a different line in the same scanning direction, thereby synchronizing the displacement of said scanning means with the motion of said recording medium.

2. In a system for magnetically recording symbolic information, in combination, scanning means for the stepwise scanning of the symbol to be recorded along one line in one scanning direction, each of the steps in said stepwise scanning covering a specific portion of said symbol, a rotatable magnetic recording medium, a plurality of magnetic heads arranged in one line and communicating with said recording medium at an angle skew to the axis of rotation thereof, synchronizing means for controlling the steps in said stepwise scanning of said scanning means and for consecutively and separatively rendering operable each head in said plurality of heads in synchronism with the steps in said stepwise scanning, a pick-up means associated with said scanning means for developing electrical signals characteristic of the intelligence in the symbol portion being scanned, means for applying said signals to said heads, displacing means synchronized with the rotation of said recording medium for displacing said scanning means in a direction at right angles to said one scanning direction, thereby synchronizing the displacement of said scanning means with the rotation of said recording medium, and a connection between said displacing means and said synchronizing means for inaugurating the operation of said synchronizing means through the application of signals from said displacing means.

3. The combination according to claim 2 wherein said symbol is positioned upon the face of a cathode ray tube, and wherein said scanning means includes an electron beam.

4. The combination according to claim 2 wherein said pick-up means are photo-electric means.

5. The combination according to claim 2 wherein said pick-up means are electrostatic means.

6. The combination according to claim 2 wherein said plurality of magnetic heads comprises a plurality of independent electric coils spaced apart from each other and positioned upon a single magnetic structure.

7. The combination as claimed in claim 6 wherein said magnetic structure comprises active surface areas in form of gaps, and a part of the windings of said coils being positioned within said gaps.

8. The combination according to claim 2 wherein said plurality of magnetic heads comprises alternating laminations of relatively diamagnetic conductors and relatively paramagnetic dielectrics.

9. The combination as claimed in claim 8 wherein said relatively paramagnetic dielectrics are in contact with each other through protrusions.

10. The combination as claimed in claim 8 wherein each of said relatively diamagnetic conductors is connected to a different electric circuit.

11. In a system for magnetically recording symbolic information, in combination, a symbol bearing medium containing a plurality of symbols to be selectively recorded, scanning means adjacent to said symbol bearing medium for the stepwise scanning of the symbol to be recorded along one line in one scanning direction, positioning means including a source of coded electrical signals connected to said scanning means for selectively positioning said scanning means upon the symbol to be recorded, each of the steps in said stepwise scanning covering a specific portion of said symbol, a rotatable magnetic recording medium, a plurality of magnetic heads arranged in one line and communicating with said recording medium at an angle skew to the axis of rotation thereof, synchronizing means for controlling the steps in said stepwise scanning of said scanning means and for consecutively and separatively rendering operable each head in said plurality of heads in synchronism with the steps in said plurality of heads in synchronism with the steps in said stepwise scanning, a pick-up means associated with said scanning means for developing electrical signals characteristic of the intelligence in the symbol portion being scanned, means for applying said signals to said heads, displacing means synchronized with the rotation of recording medium for displacing said scanning means in a direction at right angles to said one scanning direction, thereby synchronizing the displacement of said scanning means with the rotation of said recording medium, and a connection between said displacing means and said synchronizing means for inaugurating the operation of said synchronizing means through the application of signals from said displacing means.

12. In a system for magnetically recording symbolic information, in combination, a symbol bearing medium containing a plurality of symbols to be selectively recorded, scanning means including an electron beam, said scanning means adjacent to said symbol bearing medium for the stepwise scanning of the symbol to be recorded along one line in one scanning direction, each of the steps in said stepwise scanning covering a specific portion of said symbol, positioning means including a source of coded electrical signals connected to said scanning means for selectively positioning said scanning means upon the signal to be recorded, a first and a second beam deflection circuit, each of said deflection circuits including a series arrangement of a multitude of impedance members, circuit closing members, each of said impedance members being connected to a specific circuit closing member, and each of said circuit closing members being operative only when activated through the application of a specific signal from said source of coded electrical signals, a rotating magnetic recording medium, a plurality of magnetic heads arranged in one line and communicating with said recording medium at an angle skew to the axis of rotation thereof, synchronizing means for controlling the steps in said stepwise scanning of said scanning means and for consecutively and separatively rendering operable each head in said plurality of heads in synchronism with the steps in said plurality of heads in synchronism with the steps in said stepwise scanning, a pick-up means associated with said scanning means for developing electrical signals characteristic of the intelligence in the symbol portion being scanned, means for applying said signals to said heads, displacing means synchronized with the rotation of said recording medium and responsive to its motion for displacing said scanning means in a direction at right angles to said one scanning direction, thereby synchronizing the displacement of said scanning means with the rotation of said recording medium, and a connection between said displacing means and said synchronizing means for inaugurating the operation of said synchronizing means through the application of signals from said displacing means.

13. In a system for magnetically recording symbolic information, in combination, a symbol bearing medium containing a plurality of symbols to be selectively recorded, scanning means adjacent to said symbol bearing medium for the stepwise scanning of the symbol to be recorded along one line in one scanning direction, positioning means including a source of coded electrical signals connected to said scanning means for selectively positioning said scanning means upon the symbol to be recorded, each of the steps in said stepwise scanning covering a specific portion of said symbol, a movable magnetic recording medium, a plurality of magnetic heads arranged in one line and communicating with said recording medium, synchronizing means for controlling the steps in said stepwise scanning of said scanning means and for consecutively and separately rendering operable each head in said plurality of heads in synchronism with the steps in said plurality of heads in synchronism with the steps in said stepwise scanning, a pick-up means associated with said scanning means for developing electrical signals characteristic of the intelligence in the symbol portion being scanned, means for applying said signals to said heads, displacing means synchronized with the motion of said recording medium for displacing said scanning means in a direction at right angles to said one scanning direction, thereby synchronizing the displacement of said scanning means with the motion of said recording medium, and a connection between said displacing means and said synchronizing means for inaugurating the operation of said synchronizing means through the application of signals from said displacing means.

14. The combination according to claim 11 wherein said displacing means include means for inaugurating the operation of said positioning means after a predetermined motion of said recording medium.

15. The combination according to claim 12 wherein each of said deflection circuits comprises an additional circuit closing member, and wherein said additional circuit closing member in said first deflection circuit is connected to said scanning means and said additional circuit closing member in said second deflection circuit is connected to said displacing means.

16. The combination according to claim 2 wherein said synchronizing means include means for terminating the operation of said scanning means after a predetermined number of steps.

17. The combination according to claim 2 comprising, a plurality of symbols to be selectively recorded, positioning means including a source of coded electrical signals connected to said scanning means for selectively positioning said scanning means upon the area of the symbol to be recorded, and a connection between said source of coded electrical signals and said displacing means wherein signals from said displacing means condition said source for the emission of a new set of coded electrical signals.

18. The combination according to claim 1 comprising a distributor and a plurality of gating members, each of said gating members being connected to a specific head in said plurality of magnetic heads and all gating members being connected to said pick-up system, said distributor receiving said clock pulses and applying same to said gating members in sequence.

19. The combination according to claim 2 wherein said scanning means include a circuit comprising a series arrangement of a multitude of impedance members, a multitude of circuit closing members, each of said impedance members being connected to a specific circuit closing member, and each of said circuit closing members being operative only when activated through the application of a specific electrical signal, and wherein said synchronizing means comprise, a flip-flop circuit connected to said displacing means and set by signals from said displacing means, an oscillator circuit connected to said flip-flop circuit, said oscillator circuit being activated by signals from said flip-flop circuit when set and producing a number of clock pulses, the number of clock pulses emitted during said set state of said flip-flop circuit being equal to the number of circuit closing members in said scanning means and to the number of heads in said plurality of magnetic heads, a distributor interposed between said oscillator circuit, on one hand, and said circuit closing members in said scanning means and said heads, respectively, on the other hand, for distributing said clock pulses consecutively and separately among all said circuit closing members and among all said heads, and a connection between said distributor and said flip-flop circuit for restoring said flip-flop circuit with the final pulse in said number of clock pulses.

20. In a system for magnetically recording symbolic information; the combination of a scanning system for scanning the symbol to be recorded along one line in one scanning direction, a pick-up means associated with said scanning system for developing electrical signals characteristic of the intelligence in the symbol portion being scanned, a rotatable magnetic recording medium, a plurality of magnetic heads arranged in a line and communicating with said magnetic recording medium at an angle skew to the axis of rotation thereof, means for applying the output of said pick-up means to said heads, control means connected to said line scanning system for inaugurating a line scanning cycle thereby and further connected to said heads to render said heads operable in succession in synchronism with the line scanning action of said scanning system, and displacement means connected to said line scanning system and responsive to the rotation of said rotatable recording medium to displace said scanning line at right angles to said one scanning direction in accordance with the rotation of said rotatable recording medium.

21. A mechanism for forming a character pattern on a moving magnetic surface comprising in combination a magnetic head having a plurality of individual juxtapositioned head elements which are operable to form a character pattern when selectively energized during alignment of the head with the plural increments of a character position on said magnetic surface, a character generator having electrical subdivisions corresponding in number to the number of increments of a character position on said magnetic surface, each of said electrical subdivisions having individual selectively conditionable means corresponding in number to the number of said magnetic head elements, means conditioning said conditionable means to form a pattern corresponding to the characters to be formed on said magnetic surface, means responsive to the alignment of increments of a character position with said magnetic head for pulsing the corresponding electrical subdivision of the character generator, and means responsive to the pulsing of said electrical subdivisions for energizing said head elements corresponding to the conditioned conditionable means in each pulsed electrical subdivision.

22. A mechanism for forming a character pattern on a moving magnetic surface comprising in combination a magnetic head having a plurality of individual juxtapositioned head elements selectively energizable as said head is aligned with a subdivision of a character position, a timing track having bits corresponding in number to the subdivisions of the character positions on said magnetic surface, a character generator having electrical subdivisions corresponding to the number of subdivisions in the character position with each electrical subdivision being further subdivided into individual conditionable means corresponding in number to the head elements of said magnetic head, means responsive to the energization of said conditionable means for energizing corresponding ones of said head element, means responsive to predetermined ones of said bits passing said reference position for conditioning said conditionable means to form an electrical pattern in said character generator, and means responsive to other bits on said timing track for energizing the electrical subdivisions of said character generator and consequently energizing said head elements whereby a character pattern is formed on said magnetic surface.

23. A mechanism for forming a character pattern on a moving magnetic surface comprising in combination a magnetic head having a plurality of individual juxtapositioned head elements selectively energizable as said head is aligned with a subdivision of a character position, a timing track having bits corresponding in number to the subdivisions of the character positions on said magnetic surface, a character generator having electrical subdivisions corresponding to the number of subdivisions in the character position with each electrical subdivision being further subdivided into individual conditionable means corresponding in number to the head elements of said magnetic head, means responsive to the energization of said conditionable means for energizing corresponding ones of said head elements, means responsive to predetermined ones of said bits passing said reference position for conditioning said conditionable means to form an electrical pattern in said character generator, means responsive to other bits on said timing track for energizing the electrical subdivisions of said character generator and consequently energizing said head elements whereby a character pattern is formed on said magnetic surface, and means responsive to the energization of each electrical subdivision of said character generator for unconditioning said individual conditioning means thereby preparing said character generator for the reception of the next character.

24. A mechanism for forming a character pattern on a moving magnetic surface comprising in combination a magnetic head having a plurality of individual juxtapositioned head elements selectively energizable during relative alignment of said head with subdivisions of a character position, a timing track coupled to said magnetic surface divided into bits corresponding to the subdivisions of the character position, means responsive to predetermined ones of said timing track bits passing a reference position for energizing selective ones of said head elements thereby forming a character pattern subdivision by subdivision on said magnetic surface.

25. A mechanism for forming a character pattern on a moving magnetic surface comprising in combination a magnetic head having a plurality of individual juxtapositioned head elements selectively energizable during relative alignment of said head with subdivisions of a character position, a timing track coupled to said magnetic surface divided into bits corresponding to the subdivisions of the character position, a predetermined electrical pattern having electrical subdivisions corresponding to the subdivisions of the character position and means responsive to a bit on said timing track passing a reference position for conditioning said electrical pattern to condition selected ones of said head elements at a character subdivision position corresponding to the electrical subdivision of the pattern.

26. A mechanism for forming a character pattern on a moving magnetic surface comprising in combination a magnetic head having a plurality of individual juxtapositioned head elements which are operable to form a character pattern when selectively energized during alignment of the head with the plural increments of a character position on said magnetic surface, a character generator having electrical subdivisions corresponding in number to the number of increments of a character position on said magnetic surface, each of said electrical subdivisions having individual selectively conditionable means corresponding in number to the number of said magnetic head elements, means conditioning said conditionable means to form a pattern corresponding to the characters to be formed on said magnetic surface, a timing track coupled to said magnetic surface, means conditioned by said timing track for emitting an impulse as each increment of a character position is in alignment with said magnetic head, means responsive to said impulses for energizing said electrical subdivisions of the character generator seriatim as said head elements are in alignment with a corresponding character subdivision position on said magnetic surface, and means responsive to the energization of said conditionable means in each electrical subdivision for energizing the corresponding head elements of said magnetic head.

27. A mechanism for forming a character pattern on a moving magnetic surface comprising in combination a magnetic head having a plurality of aligned individual juxtapositioned head elements, said head elements being selectively energizable when in alignment with subdivisions of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track coupled to said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator.

28. A mechanism for forming a character pattern on a moving magnetic surface comprising in combination a magnetic head having a plurality of aligned individual juxtapositioned head elements, said head elements being selectively energizable when in alignment with subdivision of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track coupled to said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator, said conditionable means being unconditioned as each electrical subdivision of the character generator is pulsed whereby said character generator is ready to be conditioned for the next character position.

29. A mechanism for forming a character pattern on a moving magnetic surface comprising in combination a magnetic head having a plurality of aligned individual juxtapositioned head elements, said head elements being selectively energizable when in alignment with subdivision of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track coupled to said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern, means controlled by said timing track for operating said input means when a predetermined subdivision of a character position is in alignment with said magnetic head, and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator.

References Cited in the file of this patent

UNITED STATES PATENTS

| | | |
|---|---|---|
| 1,116,949 | Stille | Nov. 10, 1914 |
| 2,097,392 | Finch | Oct. 26, 1937 |
| 2,165,770 | Tolson | July 11, 1939 |
| 2,261,762 | Hazeltine | Nov. 4, 1941 |
| 2,517,808 | Sziklai | Aug. 8, 1950 |
| 2,538,065 | Wallace | Jan. 16, 1951 |
| 2,578,025 | Sweeny | Dec. 11, 1951 |
| 2,615,990 | Blaney et al. | Oct. 28, 1952 |
| 2,641,997 | Butterfield | June 16, 1953 |
| 2,658,114 | Buhrendorf | Nov. 3, 1953 |
| 2,667,535 | Slayton | Jan. 26, 1954 |
| 2,682,043 | Fitch | June 22, 1954 |
| 2,787,654 | Peery | Apr. 2, 1957 |

OTHER REFERENCES

Journal of Franklin Institute, vol. 252, No. 5, November 1951, pages 373-381.

UNITED STATES PATENT OFFICE
CERTIFICATE OF CORRECTION

Patent No. 3,012,232              December 5, 1961

John Presper Eckert, Jr., et al.

It is hereby certified that error appears in the above numbered patent requiring correction and that the said Letters Patent should read as corrected below.

In the grant, lines 2 to 4, for "assignors to Remington Rand Inc., of Philadelphia, Pennsylvania, a corporation of Delaware," read -- assignors, by mesne assignments, to Sperry Rand Corporation, of New York, N. Y., a corporation of Delaware, --; line 13, for "Remington Rand Inc., its successors" read -- Sperry Rand Corporation, its successors --; in the heading to the printed specification, lines 4 and 5, for "assignors to Remington Rand Inc., Philadelphia, Pa., a corporation of Delaware read -- assignors, by mesne assignments, to Sperry Rand Corporation, New York, N. Y., a corporation of Delaware --; column 3, line 48, for "43N_1", second occurrence, read -- $43_1$ --; line 57, for "ben" read -- been --.

Signed and sealed this 8th day of May 1962.

(SEAL)
Attest:

ERNEST W. SWIDER
Attesting Officer

DAVID L. LADD
Commissioner of Patents